United States Patent

Maeda et al.

[19]

[11] Patent Number: 5,987,420

[45] Date of Patent: Nov. 16, 1999

[54] RESERVATION MEDIA ISSUING SYSTEM USING FUZZY LOGIC

[75] Inventors: Tadasu Maeda, Shiga-cho; Tetsuo Yoshikawa, Yokohama; Yoshiro Tasaka, Kyoto, all of Japan

[73] Assignee: Omron Corporation, Japan

[21] Appl. No.: 09/021,948

[22] Filed: Feb. 11, 1998

[51] Int. Cl.⁶ .................................................. G06F 17/30
[52] U.S. Cl. .................................... 705/5; 705/6; 706/926
[58] Field of Search ............................ 705/5, 6; 706/926

[56] References Cited

U.S. PATENT DOCUMENTS 5,839,114  11/1998  Lynch et al. ................................. 705/5

OTHER PUBLICATIONS

Helf, R.M., et al. "Business Intelligence/Customer Support Sw—Industry Report", Everen Securities, Inc., Investment(tm) Report No. 1926483, p. 19 of 44, Jul. 22, 1997.

Millman, Howard & Elizabeth U. Harding. "'Potential' Still Describes Al–Rooted Knowledge Tools", Software Magazine, vol. 11, No. 11, pp. 40–52, Sep. 1991.

Anonymous, "When 'Fuzzy' Thinking is an Asset", Business Week (Industrial Edition), p. 2d, 92e1, Apr. 22, 1985.

*Primary Examiner*—Allen R. MacDonald
*Assistant Examiner*—Susanna Meinecke-Díaz
*Attorney, Agent, or Firm*—Dickstein Shapiro Morin & Oshinsky LLP

[57] ABSTRACT

The present system comprises a device which issues tickets, a central processing device and an entrance gate device which controls entry to the site. The central processing device establishes appropriate data representing the maximum carrying capacity of each attraction (i.e., the maximum number of reservations which can be given out). It does so by performing a fuzzy inference based on fuzzy rules using as fuzzy variables various uncertainty factors which influence cancellations and other events that transpire after a reservation is made, such as type of attraction, weather, time of day, day of the week and season.

19 Claims, 5 Drawing Sheets

RESERVATION MEDIA ISSUING SYSTEM USING FUZZY LOGIC

FIELD OF THE INVENTION

This invention concerns a reservation media issuing system to issue a reservation media, such as reserved admission tickets, which could, for example, eliminate waiting lines if it were installed at the entrances of attractions in a theme park, and which would prevent the number of customers or the rate of operation from being adversely affected by canceled reservations.

BACKGROUND OF THE INVENTION

Heretofore, one problem which has occurred in, for example, large amusement parks is that a line forms at the entrance to the site of each attraction (i.e., at the entrance to each pavilion) which corresponds to its popularity. As a result, some attractions have excessively long lines while others have excessively short lines, and valuable equipment is underutilized. For the customers, this means having to waste time waiting in line for one's turn. For the proprietor, it means not being able to run the equipment efficiently. Because the customers are stuck waiting in line, they cannot use that time to patronize the shops in the park (for example, restaurants or shops featuring local products). As a result, the gross sales in the park are not what they might be. To address this problem, various systems have been considered which would issue reserved admission tickets in such a way as to optimize admissions.

The following ticketing systems are known in the prior art. The first such system was disclosed in Japanese Patent Publication 1-134565. It is a card system which reserves a turn for each patron in a pavilion of a large amusement park. This system comprises: a card on which there is stored identification data which serves to identify each patron; a means to read the data off the card; a means to store reservation data which assigns a rank to the aforesaid identification data in the order in which they are read, and stores these ranks; a control device which stores the aforesaid identification data which are read in order in the aforesaid storage device for that purpose and calculates a reserved time based on the rank of the said identification data which are read and a previously established standard time per unit of consumption; and a means to announce the said reserved time which has been calculated.

A second ticketing system is disclosed in Japanese Patent Publication 3-164992. For every pavilion and ride, the duration of the ride, its capacity, its location and other relevant data are stored in the data base of a host computer. This data is processed according to the customer's circumstances (number of people, allowed capacity, priority ranking), and a ticket is issued by a ticketing machine. The customer can thus visit each attraction in the optimal order with the minimum waiting time.

A third ticketing system is disclosed in Japanese Patent Publication 6-19940. A card which is valid as a reservation card for entry to an attraction is issued by an issuing device. The customer inserts the card into the reservation device when he wishes to enter the attraction. The total number of people who have entered that attraction is calculated and used to estimate the time when the customer may enter the attraction, which is then printed on the card. The customer has only to appear at the attraction at the printed time, and he will be allowed entry. This system eliminates long waits in a places like a large amusement park with attractions which can only accommodate a fixed number of people at a time, and in which people can easily be rerouted.

A fourth ticketing system is disclosed in Japanese Patent Publication 3-48385. The situation concerning the reservations for each attraction is stored in a computer. The customer is given a magnetic card, which he inserts in a reservation machine. At the same time, he enters the time he would like to enter the attraction. Based on the state of reservations, the computer determines whether there is still sufficient space available at the requested time. If there is, it writes the reserved time on the reservation card. When the card is read at the reserved time by a terminal installed at the gate of the attraction, the user is allowed entry. A fifth such system is disclosed in Japanese Patent Publication 4-5784.

With the first three systems described above, a terminal simply issues the customer a reservation card on which a reserved entry time is printed. The customer has no opportunity to reserve a time period that he would prefer. At a large amusement park, this may mean that the customer is unable to reserve times that fit his schedule, or, if he wishes to visit a number of attractions, that the reserved times overlap each other. And because the time required to walk from one ride to another is not considered, it can also mean that the customer does not arrive in time to use his hard-won reservation.

With the fourth and fifth systems, the customer is able to enter the reserved time which he desires; however, the determination of whether an attraction is fully booked is based on data indicating its maximum carrying capacity. In reality, cancellations and other variables may cause the number of customers showing up at a given ride at a given time to be smaller than was projected. This makes it impossible to operate the equipment efficiently. Uncertainty factors such as cancellations which come into play after the reservations are given out vary slightly with the type of attraction, the weather, the time of day, the day of the week and the season. For this reason, when the operator establishes the data representing maximum carrying capacity for each attraction (i.e., the maximum number of reservations which can be issued) he must add a value which he determines by feel on the basis of experience.

If people are making reservations for a number of attractions in a large amusement park and each person indicates a time, as in the example above, those inexperienced with the park may make reservations which do not allow them enough time to go from one attraction to the next. Their reservations will end up being canceled. In reality, then, it is necessary to guarantee a course which can be traveled in the time allotted as well as a reserved time.

The systems described above are unable to respond adequately to reservations which are canceled before the prescribed time, as frequently happens. As a result, a customer may be unable to get a reservation even though a time slot is available.

SUMMARY OF THE INVENTION

The object of this invention is to offer an reservation media issuing system to issue reserved admission tickets which prevents the number of customers from being adversely affected by canceled reservations. This invention was developed in view of the problems in prior art systems described above. The system comprises: a reservation media issuing device to issue a reservation ticket; a central processing device ; and an entrance gate device which controls entry to the site. To establish appropriate data representing the maximum carrying capacity of each attraction (i.e., the maximum number of reservations which can be given out), the central processing device performs a fuzzy inference based on fuzzy rules using as fuzzy variables various uncertainty factors which influence cancellations and other events that transpire after a reservation is made, such as type of attraction, weather, time of day, day of the week and season. In this way data can be obtained which represent a maximum carrying capacity without any waste.

The central processing device also has the capability to check the course between the attractions in an amusement park, giving consideration to both the geographical distribution of the rides and the time required to go on each ride. This will prevent reservations from being made for rides which the time frame would not allow the customer to get to.

The central processing device can also process canceled reservations and add up the points consumed by each person. This provides an incentive for repeat customers.

Other aspects and advantages of the present invention will be readily apparent from the following description and drawings which illustrate a preferred embodiment of the invention.

DETAILED DESCRIPTION OF THE INVENTION

Figure 1:
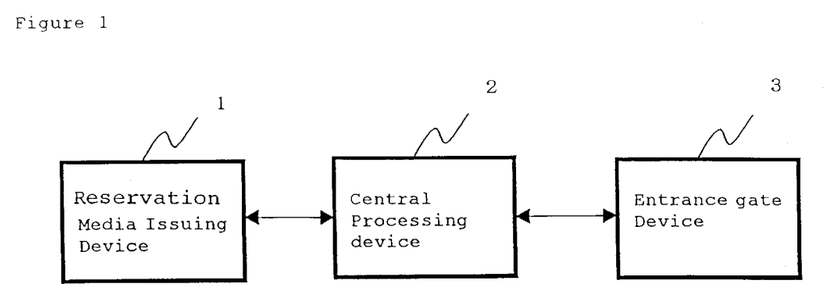
FIG. 1 is a block diagram illustrating the overall system of the present invention.

We shall now explain in detail, with reference to the appended drawings, a preferred embodiment of this invention. FIG. 1 is a general diagram of this system. When the user has entered the desired times, reservation media issuing device 1 issues a reservation ticket on which these times are both printed and recorded magnetically. Such ticketing devices are placed at the entrance gate of the amusement park and at various locations within the park where people tend to congregate. Central processing device 2 performs a fuzzy inference to determine whether a given reservation is possible based on the times issued by reservation media issuing device 1. The result of this inference is sent to device 1. Central processing device 2 is installed in the office of the amusement park, where the manager can, as needed, change the conditions which are used to set the maximum carrying capacity of each ride. When the user inserts his ticket into an entrance gate device 3, his reserved times are confirmed by central processing device 2. If his reserved time for this ride matches the current time, the gate opens and he is admitted to the ride.

Figure 2:
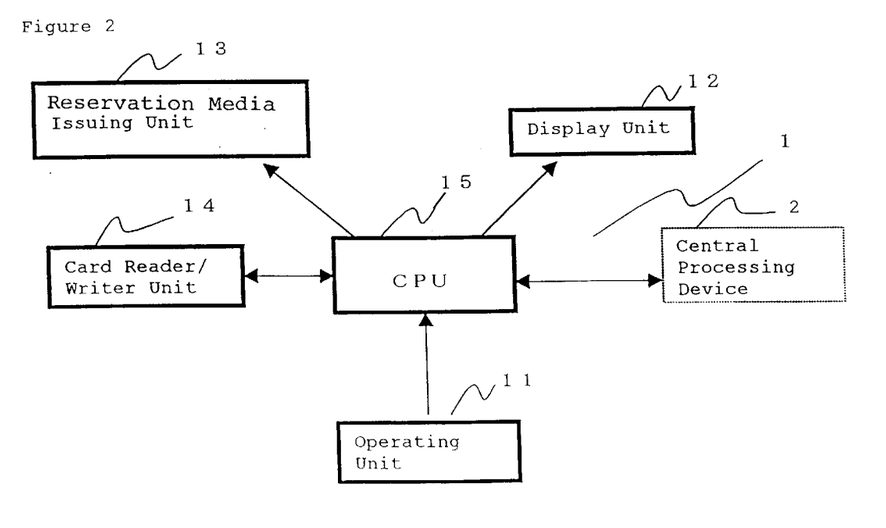
FIG. 2 is a block diagram of the reservation media issuing device.

FIG. 2 shows the components of reservation media issuing device 1. Operator unit 11 has either a ten-key array or a set of keys which are labeled with reserved times. With these keys the user enters such data as the time he wishes to reserve for each ride, whether he is willing to wait for a cancellation, the fact that he wishes to cancel the ticket which has been issued to him, the course he wishes to follow from ride to ride, and a request that this course be reviewed as to its feasibility.

Display unit 12 may, for example, be a CRT on which the user can view the reserved times and check the crowding conditions. For example, he may find out how many people are waiting for cancellations during a given period of time in order to help him make the most appropriate reservation. The times available for each ride are continually updated by central processing device 2 by way of CPU 15.

If the desired reservation is feasible, reservation media issuing unit 13 prints the name of the ride and the reserved time on the ticket, encodes the same information in a magnetic stripe and issues the ticket.

If the ticket is a magnetic card, the user inserts it into card reader/writer unit 14 each time he wishes to change or cancel a reservation for a ride, and the data on the ticket will be changed. CPU 15 controls all the units described above as well as central processing device 2.

Figure 3:
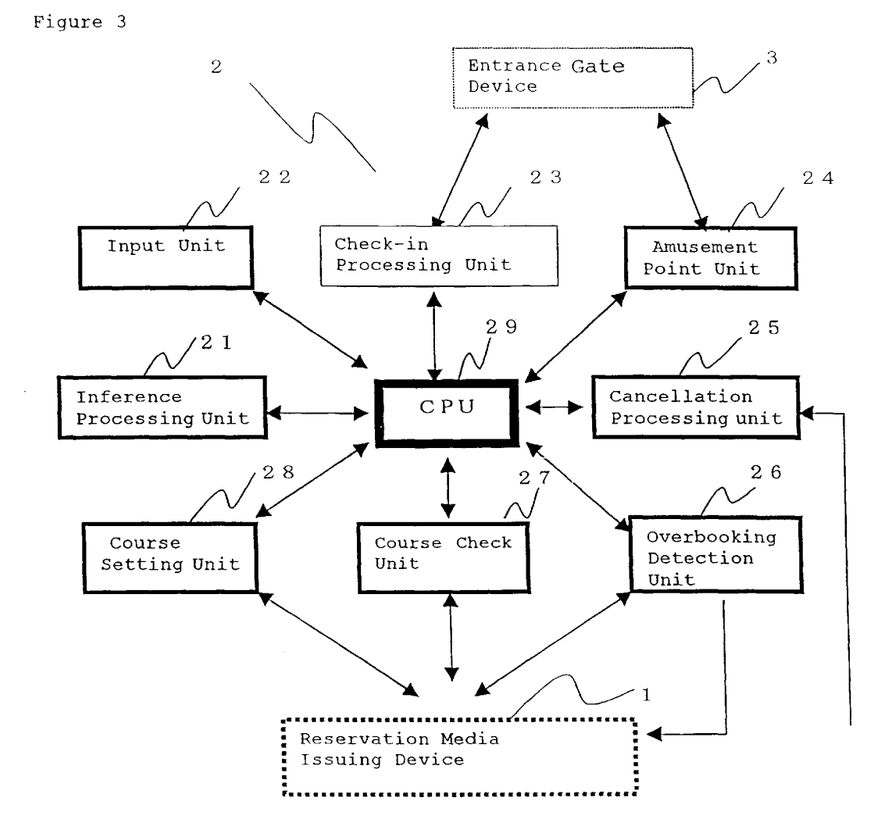
FIG. 3 is a block diagram of the central processing device.

FIG. 3 shows the components that comprise central processing device 2. A custom circuit may be designed for device 2, or an ordinary personal computer may be used. We shall proceed to explain the function of each processing element. Inference processing unit 21 performs the most essential function of this invention. To establish appropriate data representing the maximum carrying capacity of each attraction (i.e., the maximum number of reservations which can be given out), the central processing device performs a fuzzy inference for every sort of condition. These inferences are based on fuzzy rules; for the fuzzy variables, they use the various uncertainty factors which influence cancellations and other events that transpire after a reservation is made, such as type of attraction, weather, time of day, day of the week and season. The fuzzy rules might, for example, be expressed in "if, then" form with respect to each parameter. For example:

<Rule 1>
1-1. If the weather is sunny, then there will be few cancellations.
1-2. If the weather is cloudy, then there will be an intermediate number of cancellations.
1-3. If the weather is rainy, then there will be a large number of cancellations.
1-4. If the weather is snowy, then there will be a very large number of cancellations.

<Rule 2>
2-1. If the temperature is hot, then there will be a large number of cancellations.
2-2. If the temperature is normal, then there will be few cancellations.
2-3. If the temperature is cold, then there will be an intermediate number of cancellations.

<Rule 3>
3-1. If it is mealtime, then there will be a large number of cancellations.
3-2. If it is evening, then there will be an intermediate number of cancellations.
3-3. If is any other time, then there will be few cancellations.

<Rule 4>
4-1. If it is a weekday, then there will be few cancellations.
4-2. If it is a Sunday or holiday, then there will be a large number of cancellations.

The rule is established by entering an antecedent characterized by "if" and a corresponding consequent characterized by "then" which represents the rate of cancellation. In the example we have been discussing, the time, the day of the week and similar data are set automatically by the computer.

Input unit 22 is a keyboard by which the operator enters the necessary data. Check-in processing unit 23 records whether the ticket has actually been used. It functions as an interface with entrance gate device 3, which will be discussed shortly. Amusement point unit 24 to earn a point is part of a system in which members are issued magnetic cards and each attraction costs a certain number of points. The points are calculated by means of a signal from gate device 3. Cancellation processing unit 25 cancels reservations based on data generated when a customer inserts a previously issued ticket in reservation media issuing device 1 and executes the canceling operation. The ticket is processed in such a way as to make it available to a subsequent customer. As an alternative, a system operator can manually enter a cancellation which the user phones in. Overbooking detection unit 26 checks to make sure a single individual is not acquiring more tickets than he needs for a particular attraction. One system which may serve this purpose is to require that an entry pass (a ticket with a magnetic stripe, issued one to a customer) be read by reservation media issuing device 1 before a reservation ticket can be issued. A group number could also be recorded on the entry pass so that only a single reservation ticket would be issued to each group.

Course check unit 27 determines whether it is possible to get from one ride to another in the available time when a number of ride times have been reserved. The data base for this device would include such information as the time required to go on each ride or see each pavilion, the carrying capacity and location of each attraction, and similar variables. With this information the device can determine whether the reservation the user wishes to make is realistic in terms of the time and distance involved. When a request for a course is input by reservation media issuing device 1, course setting unit 28 executes processing to determine the most efficient route based on how crowded each ride is likely to be and issues reserved tickets for all requested attractions as a package. It uses the data base mentioned above to determine the best route. CPU 29 controls the various units which have been discussed. It also transmits to reservation media issuing device 1 possible reservation times for each attraction and continually updates data.

Figure 4:
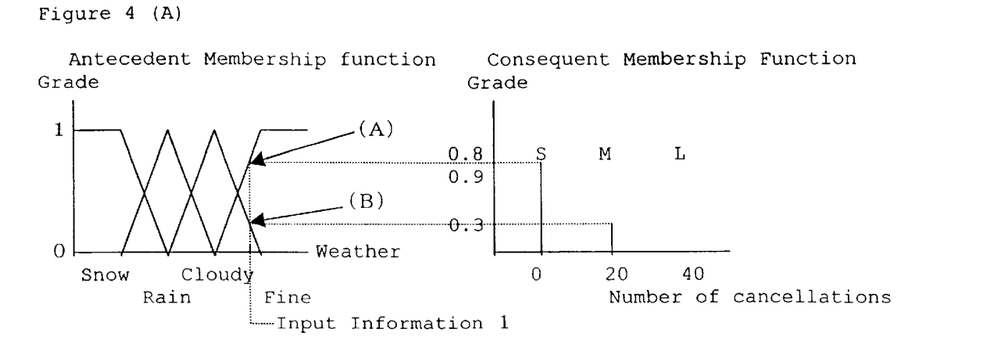
FIG. 4(A)–4(E) illustrates a membership function used by the inference processing unit.

FIGS. 4(A–E) show a membership function which indicates the expected rates of cancellation discussed above. This membership function can infer the number of cancellations for each parameter in the consequent defined after THEN based on the input information of the parameter input in the antecedent defined after IF After the individual inferences for each parameter are conducted, the system will further infer the total number of cancellations based on the individual inference results for each parameter. The following is a detailed explanation of how to calculate the total number of cancellations.

In FIG. 4(A), the antecedent of the membership function represents Weather, and input information 1 representing the weather condition is input to obtain the cross points (a) and (b) from which the cancellation degrees or numbers for cloudy and fine weather are introduced into the consequent of the membership function. In this example, the horizontal axis represents the cancellation number, and the vertical axis represents a grade or a goodness of fit. In the consequent of this example, it can be inferred that the grade of cancellation degree (small) is 0.8, and the grade of cancellation degree (large) is 0.3.

In FIG. 4 (B), the antecedent of the membership function represents. Temperature, and input information 2 representing the temperature condition is input to obtain the cross points (d) and (c), from which the cancellation degrees or numbers for medium and hot temperature are introduced into the consequent of the membership function. In this example, the horizontal axis represents the cancellation number and the vertical axis represents grade or goodness of fit. In the consequent of this example, it is inferred that the grade of cancellation degree (small) is 0.6, and the grade of cancellation degree (large) is 0.3.

In FIG. 4 (C), the antecedent of the membership function represents Time Zone, and input information 3 representing the time of day is input to obtain the cross point (e) from which the cancellation degree or number for lunch time is introduced in the consequent of the membership function. In this example, the horizontal axis represents the cancellation number and the vertical axis represents grade or goodness of fit. In the consequent, in this example, it is inferred that the grade of cancellation degree (large) is 0.7.

In FIG. 4(D), the antecedent of the membership function represents Days Of The Week, and input information 4 representing the day of the week is input to obtain the cross point (f) from which the cancellation degree or number for Friday is introduced into the consequent of the membership function. In this example, the horizontal axis represents the cancellation number and the vertical axis represents grade or goodness of fit. In the consequent in this example, it is inferred that the grade of cancellation degree (small) is 0.4, and the grade of cancellation degree (large) is 0.4.

In FIG. (E), the four antecedents in FIG. (A)–FIG. (D) are assembled to obtain the number of cancellations for the day. In this example, the maximum of the grade or goodness of fit among the them is shown as 0,8, therefore the estimated cancellations for the day is concluded as small according to so called determining MAX method.

The estimated number of cancellations which is obtained in this way is used to calculate a maximum carrying capacity so that a carrying capacity (i.e., the maximum number of reservations which may be given out) can be established for each ride on a given day at a given time. It follows, then, that if these rules are established ahead of time and new antecedents are added as needed, data representing the carrying capacity will be generated automatically, and reservations may be issued until the carrying capacity is reached. A separate framework can be used to set the number of people who will be admitted to each attraction without a reservation. The number of reserved tickets to be issued would then be determined apart from this number.

Figure 5:
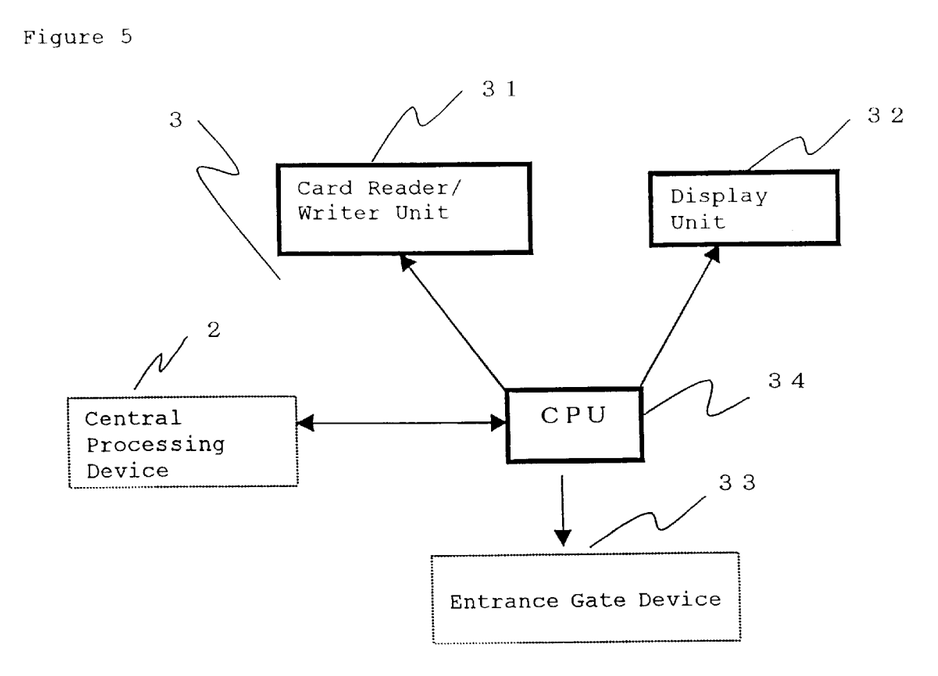
FIG. 5 is a block diagram of the entrance gate device.

FIG. 5 shows the components which comprise entrance gate device 3. One such device is installed at the entrance to each attraction. Card reader/writer unit 31 reads the ticket which each customer holds and opens the gate. The result of this operation is transmitted by way of CPU 34 and processed by central processing device 2. Display unit 32 displays the data recorded on the ticket and those it receives from central processing device 2. Gate release unit 33 determines whether the reserved time recorded on the ticket which has been read corresponds to the current time at that attraction. If it does, CPU 34 issues a command to gate release unit 33, which allows the ticket holder to pass through the gate and enter the attraction. CPU 34 controls the interaction of central processing unit 2 vis-a-vis each of the aforesaid operation units.

We shall next explain in detail the order of operations performed in each process.

(1) The Ticketing Process

Each user must individually obtain a ticket from the reservation media issuing device 1 at the entrance to the amusement park and those installed at various locations inside the park. A selection key for each attraction and its starting time appear on display unit 12 of reservation media issuing device 1. Display unit 12 has a touch panel (operating unit 11) on the CRT which guides the user in selecting a reserved time for each attraction. This display is continually updated as central processing unit 2 determines which attractions can accept reservations. If a ride is fully booked, this information appears on display unit 12. As was explained earlier, the estimate of when a ride is fully booked is made by central processing unit 2 by means of a fuzzy inference. This inference is based on fuzzy rules; for fuzzy variables, it uses the conditions which characterize the day, the various uncertainty factors which influence cancellations and other events that transpire after a reservation is made, such as type of attraction, weather, time of day, day of the week and season. The fuzzy inference is used to establish data which represent an appropriate maximum carrying capacity for each ride (i.e., the maximum number of reservations which can be given out). When the user has finished selecting attractions and reservation times, the rides and times he has selected are printed and encoded on a ticket by reservation media issuing unit 13, and the ticket is issued. This ticket will be read by the entrance gate device 3 at each attraction to determine whether the holder should be admitted.

(2) The Process of Canceling a Ticket

If the user wishes to cancel a ticket once it has been issued, he inserts it into card reader/writer unit 14 in reservation media issuing device 1 and executes the cancellation process. The resulting data are transmitted to central processing device 2, and the reservation data for those times are canceled. The user can, as needed, select new reservation times and request that a new ticket be issued. Depending on the application, the canceled reservations may be processed under a separate framework and assigned to people on the waiting list. People who are willing to wait for cancellations are issued a waiting list ticket by the reservation media issuing device 1. This ticket has the name of the attraction for which the holder is awaiting a canceled reservation and his number on the waiting list. If there are cancellations, they appear in an orderly fashion on display unit 32 of entrance gate device 3, and people on the waiting list are admitted according to their number.

(3) The Process of Establishing a Course

The user enters the names of the attractions he wishes to visit via operating unit 11 on reservation media issuing device 1. Based on the data which are entered, central processing device 2 works out the optimal course for the user to take by considering the time reserved for each ride, the time required to go from one ride to the next, the time it takes to go on each ride and the location of the ticketing device 1 which is executing this operation. A ticket on which the result is printed and encoded on a magnetic stripe is issued by reservation media issuing unit 13. Another possibility would be for the user to enter the names of a number of rides and the approximate times he wants to reserve. Central processing device 2 would then assign reservation times starting with the closest ride.

(4) The Process of Computing amusement Points

For some applications, the user will have to present the magnetic card he received as an entrance pass or a special membership card in order to obtain a ticket. The member's ID number is recorded on this entrance pass or membership card so that a specified number of points can be made available each time he visits the park. Then for every certain number of points used, he can receive a certain additional service. This system is similar to a mileage service in the airline business.

(5) The Process of Preventing overbooking in Reservations

This process prevents an individual from acquiring a large number of reservations for the same time. Because this process requires that the user be identified, it entails that he present to reservation media issuing device 1 either an entrance pass with a magnetic stripe or a membership card which must be read before the aforesaid ticketing process may be executed. If an individual attempts to make a number of reservations for a single ride at the same time using the same entrance pass or membership card, central processing device 2 will recognize this as an attempt to overbook reservations and will refuse to issue them.

When this invention is implemented in the form which has been described, the following effects are achieved. The maximum number of tickets which may be issued is not fixed. Rather, it is determined through fuzzy rules using as fuzzy variables various uncertainty factors such as type of attraction, weather, time of day, day of the week and season. Since the use of fuzzy inference results in the number of tickets actually issued closely approximating the number of users who show up at the ride, it makes possible a reservation system with very little waste. When reservations are canceled, a corresponding number of additional tickets can be issued.

Cancellations can be disposed of using a separately processed waiting list and the resulting tickets can be issued to those waiting at the gate for cancellations. This makes the reservation system even more efficient.

In larger amusement parks, a first-time customer may be unfamiliar with the layout of the park and so may make reservations for rides which the geography of the park will never allow him to get to in time. With this invention, a course is automatically laid out for him, so this type of waste is prevented.

For the repeat customer, the ability to add up usage points can provide a considerable sales incentive.

The processing which prevents an individual from improperly making multiple reservations, as has occurred in the past, allows the equipment in an amusement park to be operated efficiently.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but are commensurate with the spirit and scope of the invention.

What is claimed is:

1. A reservation media issuing system, comprising:
   a reservation media issuing device to issue reservation media containing reservation data which represents a specific reserved time and date;
   a central processing device having an inference processing unit which performs an inference to determine a maximum number of said reservation media which can be issued by said reservation media issuing device; and
   an entrance gate device to read said reservation data on said reservation media and to execute processing to admit a holder of said reservation media.

2. A reservation media issuing system according to claim 1, wherein said reservation media is a reserved admission ticket.

3. A reservation media issuing system according to claim 2, wherein said reserved admission ticket has a magnetic stripe.

4. A reservation media issuing system according to claim 2, wherein said reserved admission ticket is an ID card.

5. A reservation media issuing system according to claim 2, wherein said reserved admission ticket is an optical card.

6. A reservation media issuing system according to claim 1, wherein said inference is performed by fuzzy logic inference.

7. A reservation media issuing system according to claim 6, wherein said fuzzy logic inference is performed based on fuzzy rules using, as fuzzy variables, type of attraction, weather, time of day, day of the week and season of the year in order to determine a number of cancellations anticipated and thereby a maximum number of said reservation media which may be issued.

8. A reservation media issuing system according to claim 1, wherein said central processing device further comprises a cancellation processing unit which cancels said reservation media.

9. A reservation media issuing system according to claim 8, wherein said cancellation processing unit further determines said maximum number of said reservation media based on a waiting list.

10. A reservation media issuing system according to claim 1, wherein said central processing device further comprises a course check unit to check a feasibility of a course defined in said reservation data.

11. A reservation media issuing system according to claim 1, wherein said central processing device further comprises a course setting unit to determine an efficient route.

12. A reservation media issuing system according to claim 11, wherein said efficient route is determined based on input request time.

13. A reservation media issuing system according to claim 1, wherein said central processing device further comprises an amusement point unit to accumulate an amusement point for each attraction.

14. A reservation media issuing system according to claim 1, wherein said central processing device further comprises an overbooking detection unit to prevent a single individual from acquiring an unfair amount of said reservation media.

15. A method for controlling admission to a certain location through a reservation system, comprising the steps of:

performing an inference to determine the maximum number of reservation media which can be issued for a certain location;

issuing reservation media containing reservation data which represents a specified reserved date and time;

reading said reservation data contained on said reservation media at a later time;

allowing admission to said certain location if the current date and time is approximately equal to the specified date and time.

16. The method of claim 15, wherein the step of issuing reservation media further comprises issuing a magnetic stripe card.

17. The method of claim 15, wherein the step of reading is performed using a magnetic card reader.

18. The method of claim 15, wherein the step of performing an inference further comprises performing a fuzzy logic inference.

19. The method of claim 18, wherein the step of performing a fuzzy logic inference is performed using type of attraction, weather, time of day, day of the week, and season of the year as fuzzy variables, and wherein said fuzzy logic inference determines an anticipated number of cancellations.

* * * * *